United States Patent
Miyano

(10) Patent No.: US 12,327,412 B2
(45) Date of Patent: Jun. 10, 2025

(54) MOVEMENT STATE ESTIMATION DEVICE, MOVEMENT STATE ESTIMATION METHOD AND PROGRAM RECORDING MEDIUM

(71) Applicant: NEC CORPORATION, Tokyo (JP)

(72) Inventor: Hiroyoshi Miyano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 16 days.

(21) Appl. No.: 17/849,211

(22) Filed: Jun. 24, 2022

(65) Prior Publication Data

US 2022/0327839 A1  Oct. 13, 2022

Related U.S. Application Data

(63) Continuation of application No. 16/296,516, filed on Mar. 8, 2019, now Pat. No. 10,755,108, which is a
(Continued)

(30) Foreign Application Priority Data

Jan. 14, 2015  (JP) .................................. 2015-004963

(51) Int. Cl.
*G06V 20/52* (2022.01)
*G06T 7/246* (2017.01)
(Continued)

(52) U.S. Cl.
CPC .............. *G06V 20/53* (2022.01); *G06T 7/246* (2017.01); *G06T 7/248* (2017.01); *G06T 7/254* (2017.01);
(Continued)

(58) Field of Classification Search
CPC ........ G06V 20/53; G06V 40/10; G06V 40/25; G06V 20/52; G06V 40/103; G06V 40/20;
(Continued)

(56) References Cited

U.S. PATENT DOCUMENTS 9,165,190 B2  10/2015  Zhang et al.
9,741,129 B2  8/2017  Holtz et al.
(Continued)

FOREIGN PATENT DOCUMENTS

JP  4-60880 A  2/1992
JP  4-75199 A  3/1992
(Continued)

OTHER PUBLICATIONS

Chan, Privacy preserving crowd monitoring: Counting people without people models or tracking, Jun. 2008, 2008 IEEE Conference on Computer Vision and Pattern Recognition (Year: 2008).*
(Continued)

*Primary Examiner* — Raphael Schwartz

(74) *Attorney, Agent, or Firm* — Sughrue Mion, PLLC

(57) ABSTRACT

[Problem] To provide a motion condition estimation device, a motion condition estimation method and a motion condition estimation program capable of accurately estimating the motion condition of monitored subjects even in a crowded environment. [Solution] A motion condition estimation device according to the present invention is provided with a quantity estimating means and a motion condition estimating means. The quantity estimating means uses a plurality of chronologically consecutive images to estimate a quantity of monitored subjects for each local region in each image. The motion condition estimating means estimates the motion condition of the monitored subjects from chronological changes in the quantities estimated in each local region.

17 Claims, 9 Drawing Sheets

Related U.S. Application Data continuation of application No. 15/543,408, filed as application No. PCT/JP2016/000146 on Jan. 13, 2016, now Pat. No. 10,325,160.

(51) Int. Cl.

| | | |
|---|---|---|
| *G06T 7/254* | (2017.01) | |
| *G06V 40/10* | (2022.01) | |
| *G08G 1/01* | (2006.01) | |
| *G08G 1/04* | (2006.01) | |

(52) U.S. Cl.
CPC .... *G06V 40/10* (2022.01); *G06T 2207/10016* (2013.01); *G06T 2207/30196* (2013.01); *G06T 2207/30242* (2013.01); *G08G 1/01* (2013.01); *G08G 1/04* (2013.01)

(58) Field of Classification Search
CPC ......... G06V 20/44; G06T 7/246; G06T 7/248; G06T 7/254; G06T 2207/10016; G06T 2207/30196; G06T 2207/30242; G06T 7/30196; G08G 1/01; G08G 1/04
See application file for complete search history.

(56) References Cited

U.S. PATENT DOCUMENTS

| | | | | |
|---|---|---|---|---|
| 2007/0032242 | A1* | 2/2007 | Goodman | G06Q 30/0261 455/453 |
| 2008/0114633 | A1* | 5/2008 | Wolf | G06F 16/786 705/7.29 |
| 2009/0158309 | A1* | 6/2009 | Moon | H04N 21/4223 725/12 |
| 2014/0072170 | A1* | 3/2014 | Zhang | G06V 20/53 382/103 |
| 2014/0320682 | A1* | 10/2014 | Kuwabara | H04N 23/80 348/208.6 |
| 2015/0120237 | A1 | 4/2015 | Gouda et al. | |
| 2016/0012608 | A1 | 1/2016 | Miyano | |
| 2016/0142679 | A1 | 5/2016 | Miyoshi et al. | |

FOREIGN PATENT DOCUMENTS

| | | |
|---|---|---|
| JP | 2001-076291 A | 3/2001 |
| JP | 2003-109001 A | 4/2003 |
| JP | 2004-534999 A | 11/2004 |
| JP | 2006-031645 A | 2/2006 |
| JP | 2006-270865 A | 10/2006 |
| JP | 2007243342 A | 9/2007 |
| JP | 2009-110054 A | 5/2009 |
| JP | 2009-294887 A | 12/2009 |
| JP | 2010-198566 A | 9/2010 |
| JP | 2012-234285 A | 11/2012 |
| JP | 2014-106879 A | 6/2014 |
| JP | 5613815 B1 | 10/2014 |
| JP | 2014-225295 A | 12/2014 |
| WO | 2012/111138 A1 | 8/2012 |
| WO | 2014/112407 A1 | 7/2014 |
| WO | 2014/203389 A1 | 12/2014 |
| WO | 2014/207991 A1 | 12/2014 |

OTHER PUBLICATIONS

Communication dated Jul. 14, 2020 from Japanese Patent Office in JP Application No. 2016-569286.
Communication dated Nov. 8, 2019, from the Co-Pending U.S. Appl. No. 16/296,516 from the United States Patent and Trademark Office.
Hiroo Ikeda et al., "No. of People Estimation Based on Crowd-Patch Learning," Proceedings of the 12th Forum on Information Technology, Information Processing Society of Japan, Sep. 2013, pp. 129-130.
International Search Report of PCT/JP2016/000146 dated Feb. 16, 2016.
Office Action issued Apr. 1, 2019 in U.S. Appl. No. 16/296,516.
Office Action issued Sep. 16, 2019 in U.S. Appl. No. 16/296,468.
Rodriguez et al., "Data-driven Crowd Analysis in Videos", 2011 IEEE Conference on Computer Vision, pp. 1235-1242 (2011).
Written Opinion of the International Searching Authority of PCT/JP2016/000146 dated Feb. 16, 2016.
Japanese Office Action for JP Application No. 2020-172914 mailed on Oct. 26, 2021 with English Translation.
Miyazaki Shinji et al., "Confusion Estimation System Using Crowd Behavior Analysis Technology", NEC Technical Report, vol. 67 No. 1, pp. 82-85, NEC Corporation, Nov. 2014, Japan.
Miyano Hiroyoshi et al., Certified security, the Image Laboratory, vol. 25, No. 10, pp. 17-21, Japan Industrial Publishing, 2014, Japan.
Japanese Office Action for JP Application No. 2016-569286 on Dec. 4, 2020 with English Translation.
JP Office Action for JP Application No. 2022-123727, mailed on Jul. 18, 2023 with English Translation.
JP Official Communication for JP Application No. 2022-123727, mailed on Dec. 26, 2023 with English Translation.
JP Office Action for JP Application No. 2024-007200, mailed on Mar. 11, 2025 with English Translation.

* cited by examiner

MOVEMENT STATE ESTIMATION DEVICE, MOVEMENT STATE ESTIMATION METHOD AND PROGRAM RECORDING MEDIUM

CROSS REFERENCE TO RELATED APPLICATIONS

This application is a divisional of U.S. application Ser. No. 16/921,447, filed Jul. 6, 2020, which is a continuation of U.S. application Ser. No. 16/296,516, now U.S. Pat. No. 10,755,108, filed Mar. 8, 2019, which is a continuation of U.S. application Ser. No. 15/543,408, now U.S. Pat. No. 10,325,160, filed Jul. 13, 2017, based on National Stage of International Application No. PCT/JP2016/000146 filed Jan. 13, 2016, claiming priority based on Japanese Patent Application No. 2015-004963 filed Jan. 14, 2015, the contents of all of which are incorporated herein by reference in their entirety.

TECHNICAL FIELD

The present invention relates to a movement state estimation device, a movement state estimation method, and a program recording medium.

BACKGROUND ART

Various techniques for recognizing a crowd in an image have been proposed. For example, PTL 1 describes a number-of-persons measurement device that measures the number of persons from a shot video of a crowd. The number-of-persons measurement device described in PTL 1 extracts a head of a person included in the image, based on a head model, connects head positions determined as the same person between frames by using a feature quantity such as position information and color distribution, and measures the number of persons from the connection result.

NPL 1 describes a method for estimating the number of persons in a crowd. The method described in NPL 1 seizes a crowd state including overlap of persons, by a crowd-patch that represents the crowd state by a local image, and performs recursive learning of the number of persons in the patch to thereby estimate the number of persons from a static image.

PTL 2 describes a traffic quantity measurement system capable of acquiring traffic quantity data at an examination target spot. The system described in PTL 2 identifies, from a captured image of a predetermined examination target region, a passerby in the examination target region, and determines the number of the passersby.

CITATION LIST

Patent Literature

[PTL 1] Japanese Laid-open Patent Publication No. 2010-198566
[PTL 2] Japanese Laid-open Patent Publication No. 2001-76291

Non Patent Literature

[NPL 1] Ikeda Hiroo, Oami Ryoma, "Number of People Estimation Based on Crowd-Patch Learning", Proceedings of the 12th Forum on Information Technology, Information Processing Society of Japan, pp. 129-130, September 2013

SUMMARY OF INVENTION

Technical Problem

In a crowded environment, overlaps of persons in a photographed image are large, and it is difficult to detect individual persons and track individual persons. For this reason, it is difficult to determine how many persons are moving. For example, in a case that the method described in PTL 1 is used, a head position that has been determined as the same person cannot be tracked if a frame rate is low. Thus, it is difficult to measure a flow of photographed persons and the number of the photographed persons. The system described in PTL 2 also has difficulty in recognizing individual passersby in an examination target region in a crowded environment. For this reason, the system described in PTL 2 has difficulty in appropriately grasping a quantity of passersby in the region.

Meanwhile, using a crowd-patch described in NPL 1 enables a crowd in an image to be recognized without depending on a frame rate. However, when a crowd-patch described in NPL 1 is used, it is possible to predict the number of persons that may exist in a predetermined region in an image, but it is difficult to estimate how many of such observing target objects are moving.

One of exemplified objects of the present invention is to provide a movement state estimation device, a movement state estimation method, and a program recording medium that can accurately estimate a movement state of a monitoring target even in a crowded environment.

Solution to Problem

A movement state estimation device according to the present invention is characterized by including: quantity estimation means for, by using a plurality of temporally sequential images, estimating a quantity of monitoring targets for each local region in each of the plurality of images; and movement state estimation means for estimating a movement state of the monitoring target from a time-series change in the quantity estimated in each of the local regions.

A movement state estimation method according to the present invention is characterized by including: by using a plurality of temporally sequential images, estimating a quantity of monitoring targets for each local region in each of the images; and estimating a movement state of the monitoring target from a time-series change in the quantity estimated in each of the local regions.

A program recording medium according to the present invention is characterized by recording a program for causing a computer to execute: a quantity estimation process of, by using a plurality of temporally sequential images, estimating a quantity of monitoring targets for each of local regions in the plurality of images; and a movement state estimation process of estimating a movement state of the monitoring target from time-series change in the quantity estimated in each of the local regions.

Advantageous Effects of Invention

According to the present invention, a movement state of a monitoring target can be accurately estimated even in a crowded environment.

DESCRIPTION OF EMBODIMENTS

Example Embodiment

The following describes an example embodiment of the present invention with reference to the drawings. A monitoring target mentioned in the present invention is exemplified by a person in the following description of the example embodiment, but may also be an object other than a person, such as a bicycle and an automobile.

Figure 1:
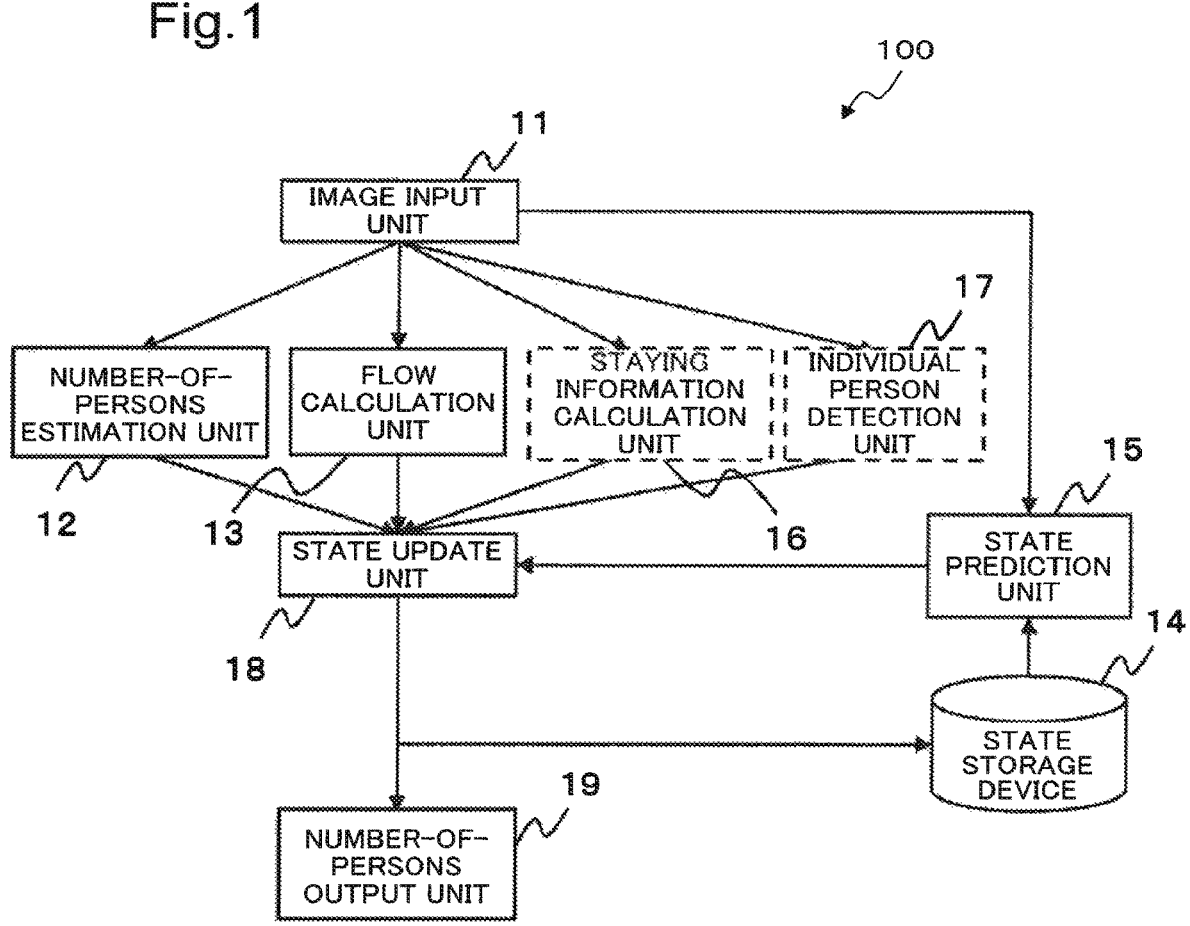
FIG. 1 is a block diagram exemplifying one example embodiment of a movement state estimation device.

FIG. 1 is a block diagram illustrating one example embodiment of a movement state estimation device according to the present invention. The movement state estimation device 100 of the present example embodiment includes an image input unit 11, a number-of-persons estimation unit 12, a flow calculation unit 13, a state storage device 14, a state prediction unit 15, a staying information calculation unit 16, an individual person detection unit 17, a state update unit 18, and a number-of-persons output unit 19. The arrows illustrated in this drawing indicate one example of flows of data. Flows of data in the movement state estimation device 100 are not limited to particular directions.

The image input unit 11 acquires, from a video (a moving image), an image at a time point of certain processing time. In the following, an image acquired by the image input unit 11 is written as "target image". The image input unit 11 receives input of a plurality of time sequence target images.

The number-of-persons estimation unit 12 estimates the number of photographed persons for each local region in a target image. In other words, the number-of-persons estimation unit 12 estimates the number of persons (a quantity of monitoring targets) for each local region of an input target image.

A method by which the number-of-persons estimation unit 12 estimates the number of persons is not particularly limited. For example, the number-of-persons estimation unit 12 may compare a crowd-patch described in NPL 1 with a local region of a target image to estimate the number of persons, or may estimate the number of persons by using a plurality of images including a target image as in a method described in PTL 1.

Figure 2:
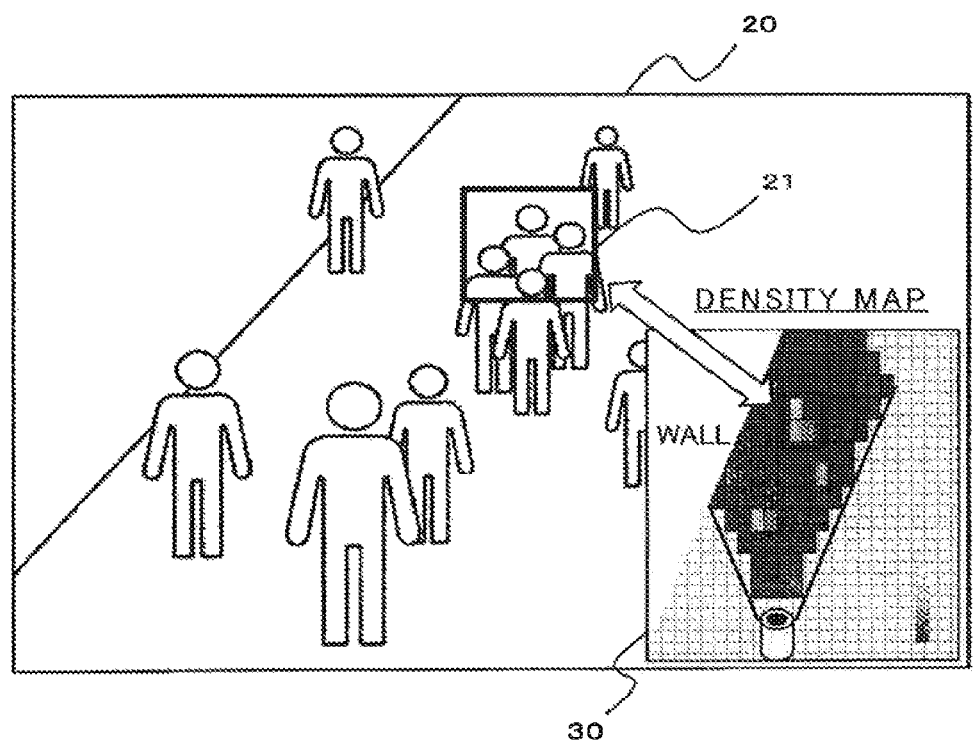
FIG. 2 is an illustration depicting an example of a process of estimating a quantity of monitoring targets.

FIG. 2 is an illustration depicting an example of a process of estimating the number of persons. As exemplified in FIG. 2, the number-of-persons estimation unit 12 extracts a local region 21 from a target image 20, and estimates the number of persons included in the local region 21. In an example illustrated in FIG. 2, the number-of-persons estimation unit 12 estimates that four persons exist in the local region 21.

The number-of-persons output unit 19 may output an image in which the number of persons estimated for each local region is expressed by using a mode (color, tone, or the like) associated with this number of persons, as exemplified by a density map 30 in FIG. 2. A concrete process performed by the number-of-persons output unit 19 is described below.

As described above, since a plurality of temporally sequential target images are input to the number-of-persons estimation unit 12 from the image input unit 11, the number-of-persons estimation unit 12 can detect a fluctuation (time-series change) in the number of persons in each local region. It is considered that particularly in a crowded environment, persons move in a certain degree of group. For this reason, the number-of-persons estimation unit 12 estimates a movement state of persons from transition of the number of persons in a local region.

Concretely, the number-of-persons estimation unit 12 predicts future locations of persons, from the movement of the persons at the time when the number of persons is estimated. The number-of-persons estimation unit 12 may assume that monitoring targets move at the same probability and at the same speed in all directions, in an initial state. Further, based on predicted future locations of persons, the number-of-persons estimation unit 12 estimates the future number of persons in each local region, as well. For the convenience of description, to estimate the future number of persons by the number-of-persons estimation unit 12 is referred to as "predict" in the following.

When predicting locations of persons, the number-of-persons estimation unit 12 may assume that each person moves at the same speed, or may use a below-described prediction result of the state prediction unit 15.

At a certain future time point, the number-of-persons estimation unit 12 compares the number of persons previously predicted for each local region with the number of persons estimated for each local region from a target image at this time point. Then, the number-of-persons estimation unit 12 estimates a movement state of persons, placing importance on the local region where a difference in the number of persons is smaller. Concretely, the number-of-persons estimation unit 12 may estimate that a person existing in a particular local region has moved to another local region that is one of a plurality of local regions near the particular local region and in which a difference in the number of persons estimated from the target image is the smallest.

Figure 3:
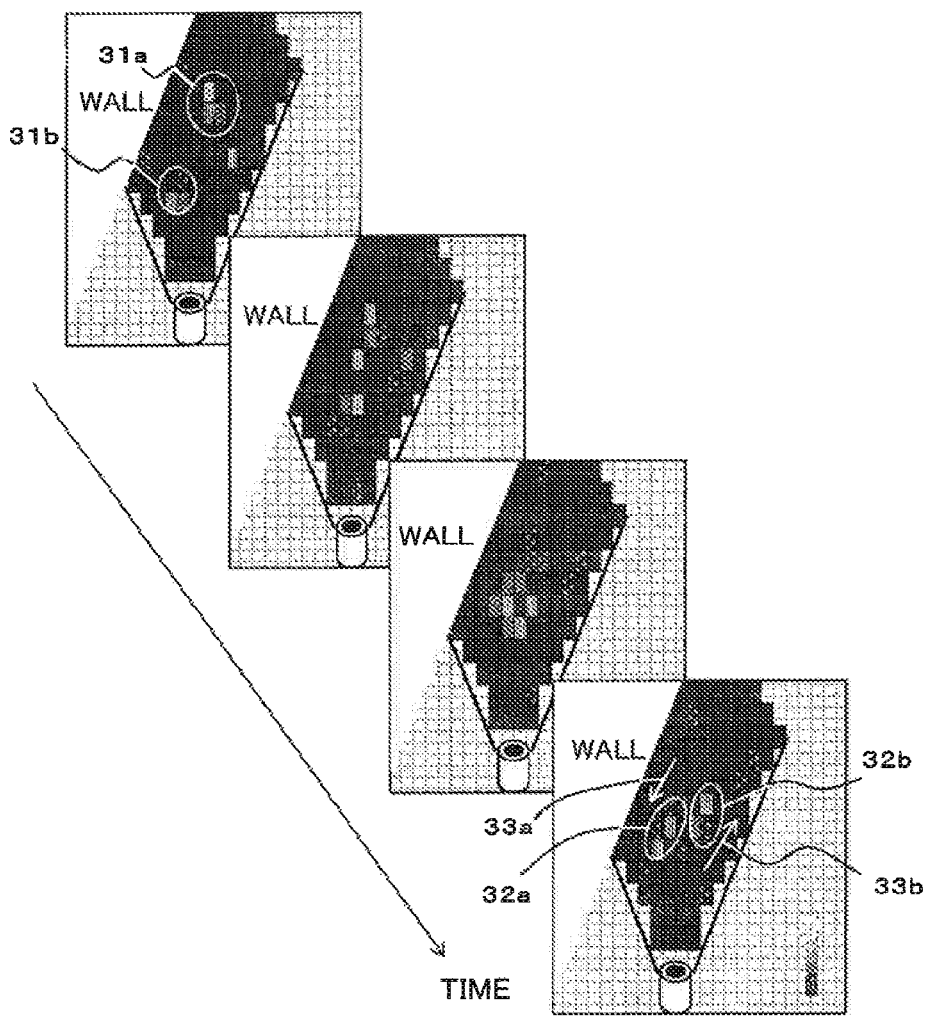
FIG. 3 is an illustration depicting an example of a movement state of monitoring targets.

The density map 30 exemplified in FIG. 2 represents a movement state of persons. FIG. 3 is an illustration depicting an example of a movement state of persons. A density map exemplified in FIG. 3 indicates that more persons exist in a lighter color region.

For example, it is assumed that the number-of-persons estimation unit 12 estimates that many persons exist in the region 31a and the region 31b in a target image at a certain time point. It is assumed that the number-of-persons estimation unit 12 continues to perform the estimation, and as a result, many persons move to the region 32a and the region 32b in a target image at another time point. It becomes possible to detect, from this time-series change, a movement (the arrow 33a) of persons from the region 31a to the region 32a, and a movement (the arrow 33b) of persons from the region 31b to the region 32b.

The number-of-persons estimation unit 12 may determine whether a person included in a target image at a certain time point is a person who newly appears at this time point, or an already existing person who has been present in the target image before this time point (i.e., a person who has moved within the shot region). For example, when estimating existence of a person at a location to which a person has not been predicted to move from the target image, the number-of-persons estimation unit 12 may determine that this person is a newly appearing person.

The flow calculation unit 13 calculates an optical flow for target images. A method for calculating an optical flow is not limited particularly. For example, the flow calculation unit 13 may calculate an optical flow by using a feature point as in the Lucas-Kanade method, or may calculate an optical flow by using the calculus of variations as in the Horn-Schunck method.

The state storage device 14 stores past states of persons. Here, a state of a person includes a location, a velocity, and likelihood (a weight value) of a person at a past time point. Further, a state of a person may include a behavior state (a moving state or a stationary state) of a person.

For example, in the case of using a probability hypothesis density (PHD) particle filter, a state of one monitoring target is represented by a plurality of particles. In this case, when the number of particles is N, the state storage device 14 holds, as a state of the i-th (i=1, . . . , N) particle, a location $x_i$, a velocity $v_i$, and a weight value $w_i$ which are information held in a typical particle filter. In addition to these pieces of information, the state storage device 14 may hold, as a state of each particle, a variable $s_i$ expressing whether a person is in a moving state or in a stationary state.

The total sum of weight values $w_i$ of the particles corresponds to a quantity of monitoring targets, i.e., the number of persons. For example, in a PHD particle filter, when a hundred of particles are newly scattered for one monitoring target, a weight value of each particle set at this time is "0.01".

The state prediction unit 15 predicts a state of a person at the time that the image input unit 11 acquires an image, by using a past state of the person stored in the state storage device 14. Other than a location, a velocity, and a weight value of the person, the state prediction unit 15 may predict whether a behavior state of the person is a moving state or a stationary state.

Concretely, the state prediction unit 15 predicts a future state of a person by using a plurality of particles expressing a state of this person. In the present example embodiment, the description is made on a method in which the state prediction unit 15 predicts a state of an object by using a PHD particle filter. The state prediction unit 15 predicts a state of a person at the time that the image input unit 11 acquires a target image.

As in the above-described example, in the case of using a PHD particle filter, a state of one monitoring target is expressed by a plurality of particles. When the number of particles is N, a state of the i-th (i=1, . . . , N) particle is expressed by using a location $x_i$, a velocity $v_i$, and a weight value $w_i$ which are information held in a typical PHD particle filter. A state of the particle may be expressed further by a variable $s_i$ expressing whether a person is in a moving state or in a stationary state.

A method by which the state prediction unit 15 predicts a location and a velocity is similar to a prediction method performed in a general particle filter. For example, when a location of a particle at a certain time point is x, a location of this particle after a lapse of dt is expressed by x+v×dt+e. Here, e expresses a noise that cannot be expressed in a constant velocity motion model, and for example, e is a random number value generated based on normal distribution of predetermined standard deviation. When a velocity of a particle at the location x is v, a velocity of this particle after a lapse of dt is expressed by v+f. Here, f expresses a noise that cannot be expressed in a constant velocity motion model, and for example, f is a random number value generated based on normal distribution of predetermined standard deviation.

The following describes a method in which the state prediction unit 15 predicts a behavior state. Here, it is assumed that a behavior state of a person changes from a stationary state to a moving state in accordance with predetermined probability P, and a behavior state changes from a moving state to a stationary state based on predetermined probability Q.

When $s_i$ expresses a stationary state, the state prediction unit 15 generates a uniform random number from 0 to 1, and when this random number value is equal to or smaller than P, the state prediction unit 15 changes $s_i$ to a value indicating a moving state. Meanwhile, when $s_i$ expresses a moving state, the state prediction unit 15 generates a uniform random number from 0 to 1, and when this random number value is equal to or smaller than Q, the state prediction unit 15 changes $s_i$ to a value indicating a stationary state.

In addition, the state prediction unit 15 may predict a state of a variable $s_i$ based on a past history and a statistical result. For example, it is assumed that a person of a tracking target has changed from being in a stationary state to being in a moving state, and $s_i$ has become a value indicating the moving state. In the case where this change has been made recently, and a predetermined period is yet to lapse from the change to the moving state, it can be supposed that this tracking target does not return to being in a stationary state soon. For this reason, in this case, the state prediction unit 15 may hold the behavior state in the moving state for a fixed period.

Similarly, it is assumed that a person of a tracking target has changed from being in a moving state to being in a stationary state, and $s_i$ has become a value indicating the stationary state. In the case where this change has been made recently, and a predetermined period is yet to lapse from the change to the stationary state, it can be supposed that this tracking target does not return to being in a moving state soon. For this reason, in this case, the state prediction unit 15 may hold the behavior state in the stationary state for a fixed period.

In addition, the state prediction unit 15 may change a condition for changing a behavior state, depending on a location in an image. For example, in a region in an image where a pathway exists, the state prediction unit 15 may set, at a small value, change probability Q of change from a moving state to a stationary state. In a region in an image including an area often used for a rendezvous, the state prediction unit 15 may set, at a large value, the change probability Q.

The staying information calculation unit 16 extracts a region determined as a staying object, by using a target image acquired by the image input unit 11. For example, the staying information calculation unit 16 may determine, for each pixel, whether or not an object is a temporarily stationary one, by using a method for detecting an object stationary for a long period, and may detect a region that is determined as the temporarily stationary object, by a labeling process.

The individual person detection unit 17 detects an individual person from a target image. For example, a person existing on a front side in an image can be often detected by a general detection method because of being less obstructed by other objects. For this reason, the individual person detection unit 17 sets a region (referred to as an individual detection region in the following) where a person can be individually detected, and then detects a person from the individual detection region in a target image.

The state update unit 18 updates a state of a person predicted by the state prediction unit 15, based on an estimation result of the number-of-persons estimation unit 12. The state update unit 18 may update a state of a person based on process results of the flow calculation unit 13, the staying information calculation unit 16, and the individual person detection unit 17. The following concretely describes a method by which the state update unit 18 updates a monitoring target.

Depending on the number of persons in each local region estimated by the number-of-persons estimation unit 12, the state update unit 18 updates a state of a person in the corresponding region. In the present example embodiment, depending on the number of persons in each local region estimated by the number-of-persons estimation unit 12, the state update unit 18 updates a weight value $w_i$ of a particle predicted to exist in the corresponding region.

Concretely, the state update unit 18 updates a weight value $w_i$ of each particle such that the total sum of weights in the local region becomes equal to the number of persons. At this time, the state update unit 18 may update a weight value $w_i$ of each particle by using a, a predetermined value between 0 and 1, such that the total sum of updated weights becomes $(1-\alpha)\times$(the last total sum of weights)$+\{\alpha\times$(the number of persons)$\}$ so as to cause a weight value $w_i$ to change gradually. In this manner, the state update unit 18 may update weight values of particles such that the total sum of weight values approaches the number of persons in the local region.

Figure 4:
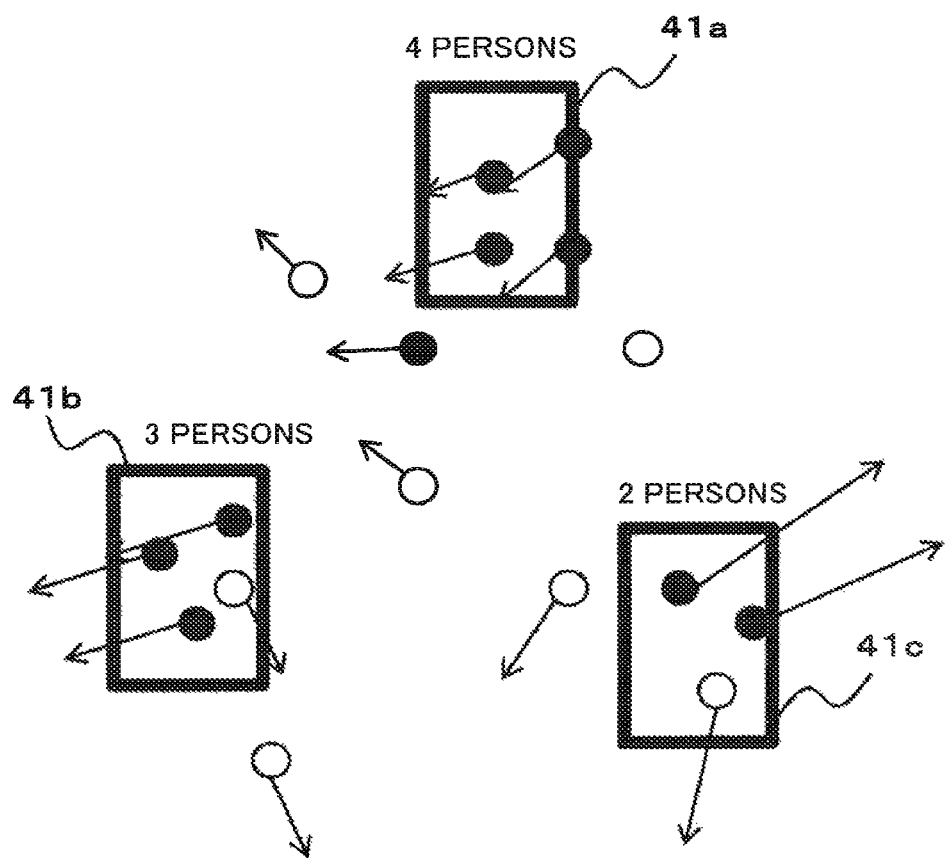
FIG. 4 is an illustration depicting relation between a local region for which a quantity of monitoring targets has been estimated and particles existing in this local region.

FIG. 4 is an illustration depicting a relation between a local region whose number of persons have been estimated and particles existing in this local region. In FIG. 4, white and black circles represent particles. The black particles represent particles whose moving directions (the arrows in the drawing) are the same as the specific direction or within a predetermined angle from the specific direction. In an example illustrated in FIG. 4, persons existing in a local region 41a of a target image and having moving directions that are the same as the specific direction or within the predetermined angle from the specific direction are four persons. Persons existing in a local region 41b and having moving directions that are the same as the specific direction or within the predetermined angle from the specific direction are three persons. Persons existing in a local region 41c and having moving directions that are the same as the specific direction or within the predetermined angle from the specific direction are two persons. For example, for three particles included in the local region 41c, the state update unit 18 updates a weight value of each particle such that the total sum of the weight values becomes two.

When the number-of-persons estimation unit 12 estimates the number of persons for local regions overlapping each other, the state update unit 18 may update weight values of particles individually for each local region, or may update weight values of particles all together for one region into which the local regions overlapping each other are combined. When combining the regions into one to update weight values, the state update unit 18 may set the number of persons in the overlapped region at the number of persons taking into account the number of persons for each local region (e.g., the average number of persons of the overlapped local regions).

Figure 5:
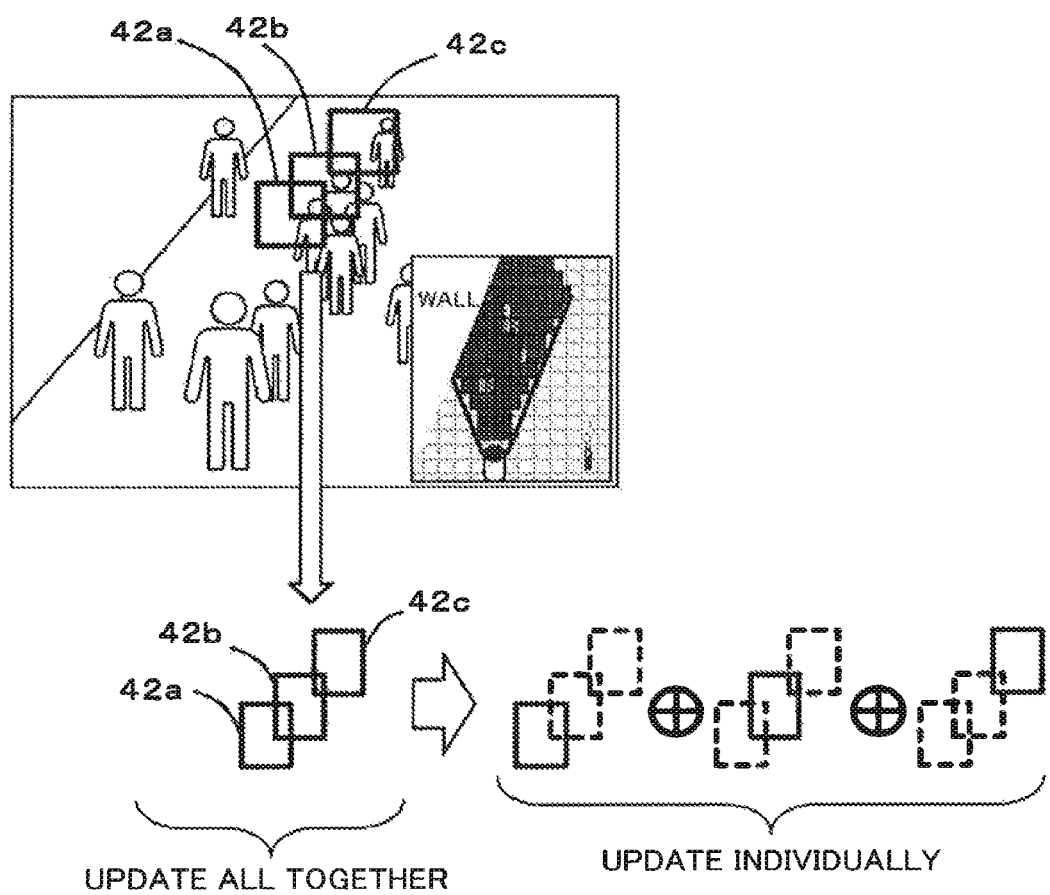
FIG. 5 is an illustration depicting an example of a process of updating weight values when local regions overlap each other.

FIG. 5 is an illustration depicting an example of a process of updating weight values when local regions overlap each other. The example illustrated in FIG. 5 represents the case of estimating the number of persons for three local regions partially overlapping each other. In this case, the state update unit 18 may update weight values of particles all together for one region into which the local region 42a, the local region 42b, and the local region 42c are combined. Alternatively, the state update unit 18 may update weights of particles included in each local region individually for the local region 42a, the local region 42b, and the local region 42c, respectively.

The state update unit 18 may update weight values of particles included in a local region, at the same ratio for the all or at ratios different from particle to particle. For example, depending on detection probability of persons, the state update unit 18 may change weight values of particles to be updated. Concretely, when the detection probability of each particle is Pi, and the estimated number of persons is H, the state update unit 18 may calculate a weight value $w_i$ of each particle to be updated, as $[(1-P_i)*w_i+H*(P_i*w_i)/\{\text{the total sum of }(P_i*w_i)\}]$ By adopting such a weight value $w_i$, the state update unit 18 can set a weight value that is more influenced by the estimated number H of persons as detection probability becomes higher. In a case with a location where no persons are detected, since detection probability becomes zero, a weight value does not change. Changing a weight value to be updated, depending on detection probability, enables the update process to be performed prioritizing information of a region having higher detection probability, for example for an image shot from a low depression angle.

Figure 6:
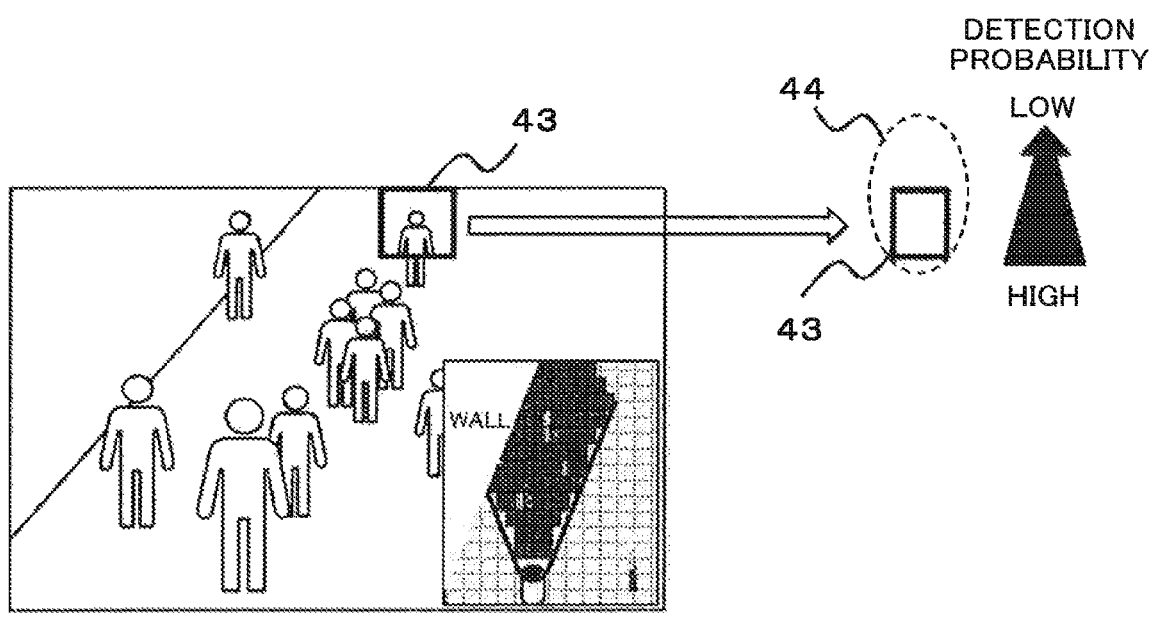
FIG. 6 is an illustration depicting an example of a condition in which detection probability varies.

FIG. 6 is an illustration depicting an example of a condition in which detection probability varies. As exemplified in FIG. 6, a far end side in a target image is often shot at a low depression angle. For example, it is assumed that detection probability of a circumference 44 of a local region 43 decreases from a near side toward a back side. For this reason, the state update unit 18 updates a weight of a particle existing on the front side to be higher, and updates a weight of a particle existing on the back side to be lower.

When no particles exist at a location corresponding to a local region for which the number-of-persons estimation unit 12 has estimated the number of persons, the state update unit 18 newly generates a particle at this location. Concretely, the state update unit 18 may newly generate a particle randomly near this location in accordance with normal distribution of predetermined standard deviation.

The state update unit 18 may perform update so as to increase a weight value $w_i$ of a particle whose movement is close to an optical flow of target images. At this time, the state update unit 18 update a weight value $w_i$ so as not to change the total sum of the weights.

For example, assuming that an angle between a vector of the optical flow and a vector expressing movement of a particle i is $\theta$, a closeness degree $L_i$ in movement between these two vectors is calculated by $L_i=(\cos \theta+1)/2$. $L_i$ is a value that becomes larger for a particle whose movement is closer to the optical flow. When the total sum of weight values is S, the state update unit 18 may update a weight value of each particle by $[L_i*w_i/\{\text{the total sum of }(L_i*w_i)\}]*S$. By performing such update, a particle whose movement is closer to the optical flow has a larger weight value $w_i$.

A method for updating a weight value of a particle whose movement is closer to the optical flow is not limited to the above-described method. Alternatively, when the angle θ between these vectors is equal to or smaller than a threshold value, the state update unit 18 may simply multiply a weight value of the particle by a positive constant, and then normalize each weight value such that the total sum of the weight values multiplied by the constant becomes equal to the total sum S of the original weight values. At the time of determining a closeness degree in movement, the state update unit 18 may determine, as a particle of close movement, a particle for which a distance between the vectors is equal to or smaller than a threshold value.

The state update unit 18 may update a weight value of a particle depending on a closeness degree between a region determined as a staying object by the staying information calculation unit 16 and a behavior state of the particle. Concretely, the state update unit 18 may perform update so as to more increase a weight value of a particle as a distance between a region determined as a staying object by the staying information calculation unit 16 and the particle whose behavior state has been predicted as a stationary state is shorter. At this time, the state update unit 18 may update a weight value of the particle, for example by using a method similar to the method of updating a weight value of a particle whose movement is close to the optical flow.

When the individual person detection unit 17 detects a person in an individual detection region, the state update unit 18 may update weight values of particles existing in a region associated with the detected person, in a general method performed in a PHD particle filter. In other words, for an area where the individual person detection unit 17 has detected persons, the state update unit 18 may update weight values of particles included in each local region, by a method other than the method using the estimated number of persons in each local region. Selecting the more suitable prediction method depending on a region in a shot image in this manner makes it possible to improve accuracy in tracking a monitoring target.

The state update unit 18 deletes a particle whose weight value $w_i$ is equal to or smaller than a threshold value. The state update unit 18 updates location information of a person in a manner similar to a typical tracking process. The state update unit 18 records an updated state of a person in the state storage device 14. The state update unit 18 may perform re-sampling of scattering particles again depending on weight values of the respective particles.

The number-of-persons output unit 19 outputs the number of persons in a shot area, based on states of persons. Concretely, the number-of-persons output unit 19 outputs the number of persons included in a target image, by using weight values $w_i$ of particles updated by the state update unit 18.

As described above, the total sum of weight values $w_i$ of particles corresponds to the number of persons. For this reason, the number-of-persons output unit 19 may calculate the total sum of weight values $w_i$ of particles and output the number of persons in a shot area. When outputting the number of persons in a predetermined region, the number-of-persons output unit 19 may identify particles existing in this region, and may calculate the total sum of weight values $w_i$ of the identified particles.

When a state of each particle includes a behavior state, the number-of-persons output unit 19 may calculate the total sum of weight values $w_i$ of the particles in a stationary state, and may output the number of persons staying in a shot area, for example.

The number-of-persons output unit 19 may output the number of persons that have moved in a specific direction, and the number of persons that have crossed over a line set at a predetermined location in a shot area (i.e., the number of persons that have crossed over the predetermined line), by using states of current particles and states of past particles. Concretely, the number-of-persons output unit 19 outputs the number of persons that have crossed over the predetermined location, based on weighs of particles that have crossed over this location. The following describes a method of calculating the number of persons by using temporally changing particles.

When calculating the number of persons that have moved in a specific direction, for example, the number-of-persons output unit 19 may identify particles whose past and current locations are connected by a line whose direction is the same as the specific direction or makes a predetermined angle or less with the specific direction, and may calculate the total sum of weight values of these particles. At the time of calculating the total sum of weight values of the particles, the number-of-persons output unit 19 may use weight values of past particles, may use weight values of current particles, or may use an average of the weight values of both of the particles.

When calculating the number of persons that have crossed over the predetermined line, the number-of-persons output unit 19 identifies particles that have crossed over the predetermined line in the course of moving from the last location to the present location, and calculates the total sum of weight values of these particles. For example, when among particles that cross over the predetermined line, only the particles that have moved in a specific direction are targeted, the number-of-persons output unit 19 may target particles whose moving directions are each expressed by a vector that makes an inner product equal to or larger than zero, with a normal vector of the predetermined line. Concretely, assuming that the predetermined line mentioned here is a horizontal straight line, particles crossing over this straight line include particles moving from locations above this straight line to locations below this straight line, and particles moving from locations below this straight line to locations above this straight line. When among these particles, particles moving from above to below are targeted, the number-of-persons output unit 19 calculates an inner product of a normal vector (a vector directed just below in this case) to the horizontal straight line and a vector expressing a moving direction of each particle, and targets particles for which the inner product is equal to or larger than zero.

The number-of-persons output unit 19 can output the number of persons that have crossed over the predetermined line in a predetermined period, by integrating the total sums of weight values in the predetermined period. The number-of-persons output unit 19 can use current weight values, past weight values, or both thereof, as weight values of particles used in calculating the total sums of weight values, in the same manner as in the case of calculating the number of persons that have moved in the specific direction.

Particles newly generated at the current time point do not have past states, and for this reason, are not included in targets for calculating these numbers of persons.

Figure 7:
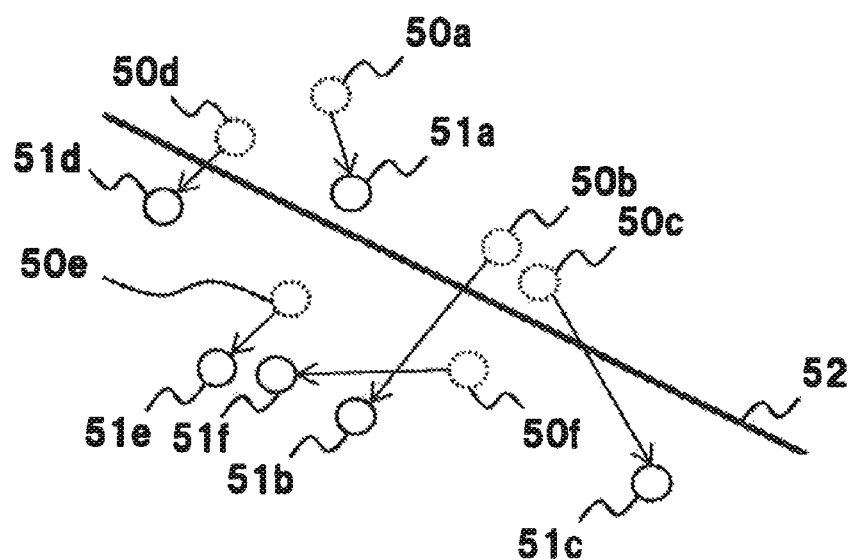
FIG. 7 is an illustration depicting an example of a process of calculating a quantity of monitoring targets that have crossed over a predetermined location.

FIG. 7 is an illustration depicting an example of a process of calculating a quantity of monitoring targets that have crossed over a predetermined location. The circles of the broken lines exemplified in FIG. 7 represent past particles, the circles of the solid lines represent current particles. The arrows exemplified in FIG. 7 represent a movement state of particles from the past time to the current time.

The case of calculating the number of persons that have crossed over the location indicated by the solid line 52 from above to below is assumed as one example. At this time, the number-of-persons output unit 19 identifies particles that have crossed over the solid line 52 from above to below, and calculates the total sum of weights of the identified particles. In the example illustrated in FIG. 7, the particle 50*b*, the particle 50*c*, and the particle 50*d* cross over the solid line 52 from above to below. For this reason, the number-of-persons output unit 19 calculates the total sum of particle weights of the particle 50*b*, the particle 50*c*, and the particle 50*d*, and outputs the total sum as the passing number of persons. For example, when the passing number of persons in a fixed period is to be output, the number-of-persons output unit 19 may integrate the total sums of weights of particles in the fixed period.

The image input unit 11, the number-of-persons estimation unit 12, the flow calculation unit 13, the state prediction unit 15, the staying information calculation unit 16, the individual person detection unit 17, the state update unit 18, and the number-of-persons output unit 19 can be implemented by programs. These respective units can be implemented by a processor of a computer operating in accordance with the programs.

Figure 10:
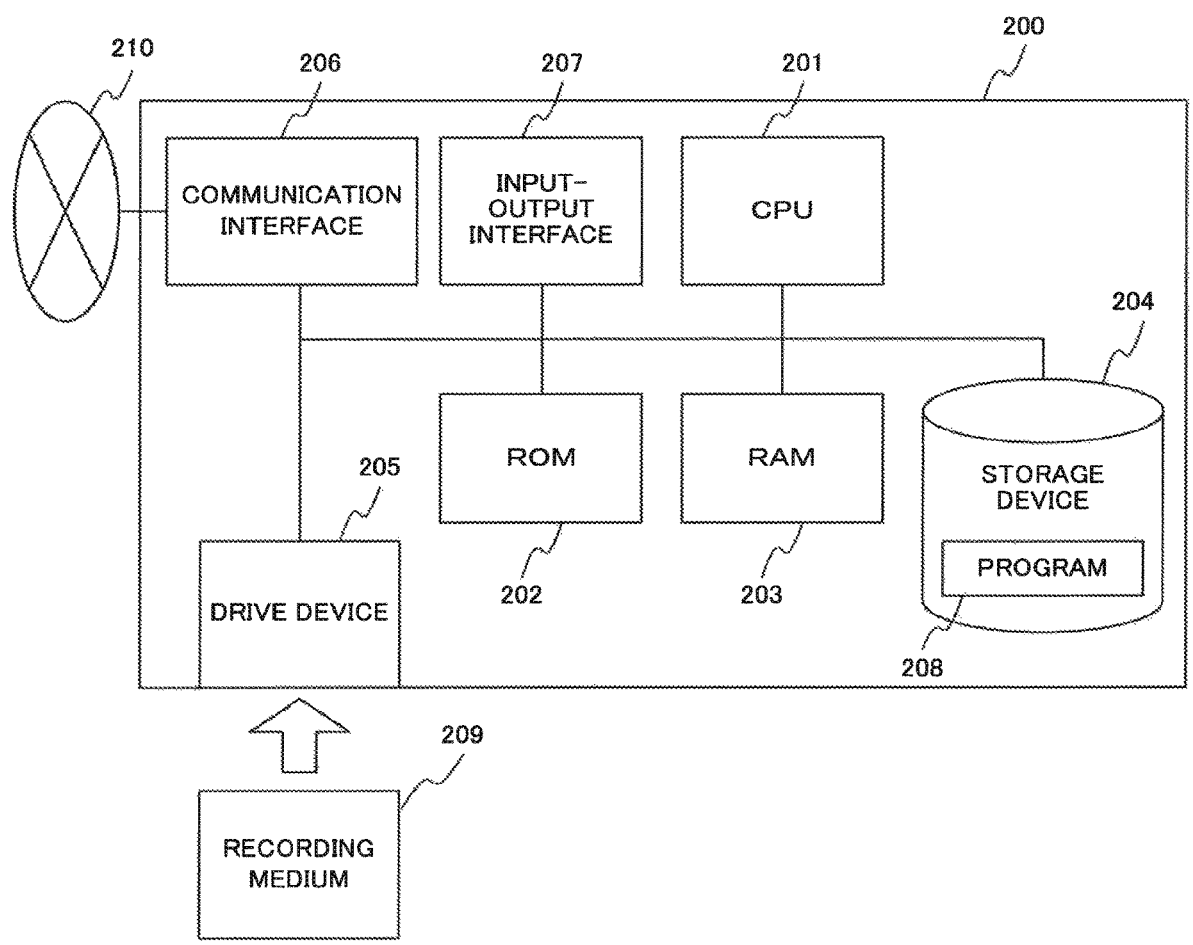
FIG. 10 is a block diagram exemplifying a hardware configuration of a computer device.

FIG. 10 is a block diagram exemplifying a hardware configuration of a computer device 200 implementing a movement state estimation device 100. The computer device 200 includes a central processing unit (CPU) 201, a read-only memory (ROM) 202, a random access memory (RAM) 203, a storage device 204, a drive device 205, a communication interface 206, and input-output interface 207. The movement state estimation device 100 can be implemented by the configuration (or a part thereof) illustrated in FIG. 10.

The CPU 201 executes a program 208 by using the RAM 203. The program 208 may be stored in the ROM 202. The program 208 may be recorded in a recording medium 209 such as a flash memory, and may be read out by the drive device 205, or may be transmitted from an external device via a network 210. The communication interface 206 exchanges data with the external device via the network 210. The input-output interface 207 exchanges data with peripheral devices (an input device, a display device, and the like). The communication interface 206 and the input-output interface 207 can function as means for acquiring or outputting data.

The movement state estimation device 100 may be configured by a single piece of circuitry (a processor or the like), or may be configured by a combination of a plurality of pieces of circuitry. The circuitry mentioned here may be dedicated or multipurpose circuitry.

The CPU 201 may function as the image input unit 11, the number-of-persons estimation unit 12, the flow calculation unit 13, the state prediction unit 15, the staying information calculation unit 16, the individual person detection unit 17, the state update unit 18, and the number-of-persons output unit 19, in accordance with the program 208.

Each of the image input unit 11, the number-of-persons estimation unit 12, the flow calculation unit 13, the state prediction unit 15, the staying information calculation unit 16, the individual person detection unit 17, the state update unit 18, and the number-of-persons output unit 19 may be implemented by dedicated hardware. The state storage device 14 may be implemented by the storage device 204, or may be an external device connected via the communication interface 206.

Figure 8:
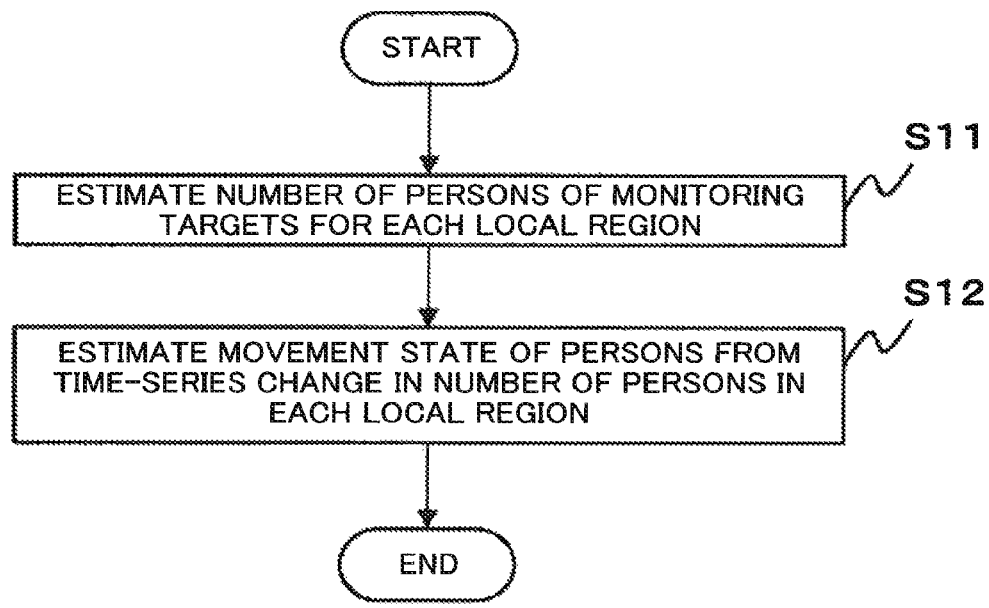
FIG. 8 is a flowchart illustrating an operation example of a movement state estimation device.

Next, operation of the movement state estimation device 100 according to the present example embodiment is described. FIG. 8 is a flowchart illustrating an operation example of the movement state estimation device 100 according to the present example embodiment. The number-of-persons estimation unit 12 estimates the number of persons for each local region in each image using a plurality of temporally sequential images (step S11). Then, the number-of-persons estimation unit 12 estimates a movement state of persons, from time-series change of the quantity estimated for each local region (step S12).

Concretely, the number-of-persons estimation unit 12 predicts future locations of persons, from the movement state of persons at the time point that the estimation is made, and predicts the future number of persons in each local region. The movement state of persons can be determined from states of particles expressing persons, for example. The number-of-persons estimation unit 12 can predict the future number of persons from future locations of particles predicted by the state prediction unit 15, for example. Further, for each local region, the number-of-persons estimation unit 12 places more importance on the local region where a difference between the predicted number of persons and the estimated number of persons is small.

As described above, in the present example embodiment, the number-of-persons estimation unit 12 estimates the number of persons for each local region in each image by using a plurality of the temporally sequential images, and estimates a movement state of persons from the time-series change in the number of persons estimated for each local region. For this reason, according to the present example embodiment, even in a crowded environment where it is difficult to track individual persons, a movement state of persons can be accurately estimated.

In the present example embodiment, the state prediction unit 15 predicts future states of persons by using a plurality of particles expressing states of persons, and the number-of-persons output unit 19 calculates the number of persons by targeting particles having weights. In other words, according to the present example embodiment, states of monitoring targets are tracked by using particles having weight values so that the number of persons that have crossed over a specific place can be counted. According to the present example embodiment, not only the number of persons that have simply crossed over a specific place, but also the number of persons that move in a specific direction can be counted. Thereby, it becomes possible to measure not only a simple crowdedness degree in a certain location, but also a flow quantity (a person flow) at this location.

[Outline]

Figure 9:
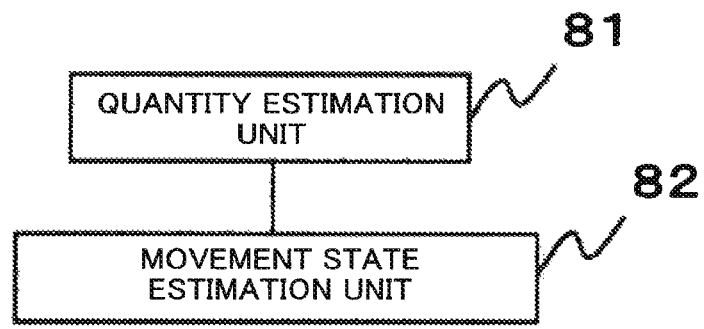
FIG. 9 is a block diagram exemplifying an outline of a movement state estimation device.

Next, an outline of the example embodiment according to the present invention is described. FIG. 9 is a block diagram illustrating the outline of a movement state estimation device in the present example embodiment. The movement state estimation device illustrated in FIG. 9 includes a quantity estimation unit 81 estimating a quantity of monitoring targets for each local region in each image by using a plurality of temporally sequential images, and a movement state estimation unit 82 estimating a movement state of the monitoring targets from time-series change in the estimated quantity for each local region. The quantity estimation unit 81 and the movement state estimation unit 82 correspond to the number-of-persons estimation unit 12 in the above-described example embodiment.

The thus-configured movement state estimation device can accurately estimate a movement state of monitoring targets even in a crowded environment.

The movement state estimation unit 82 may predict future locations of monitoring targets, from a movement state of the monitoring targets at the time point that the estimation is made, and may predict a future quantity of the monitoring targets in each local region. The movement state estimation unit 82 may compare the future quantity of the monitoring targets predicted for each local region, with the quantity of the monitoring targets estimated for each local region from a target image at the future time point, and may estimate a movement state of the monitoring targets, placing importance on the local region where the difference in the quantity is smaller.

The movement state estimation unit 82 may determine whether a shot monitoring target in a target image is a new monitoring target or a monitoring target that has moved within the target image, to estimate a movement state of the monitoring targets.

The movement state estimation device may include a prediction unit (e.g., the state prediction unit 15) predicting future states of monitoring targets by using a plurality of particles expressing states of the monitoring targets. The movement state estimation device may include an update unit (e.g., the state update unit 18) updating, depending on an estimated quantity of monitoring targets in each local region, weight values of the particles predicted to exist in each corresponding local region.

The movement state estimation unit 82 may estimate a movement state of monitoring targets from time-series change in the total sum of weight values of particles included in each local region. According to such a configuration, it becomes possible to deal with various states of movement performed by monitoring targets.

Concretely, the update unit may update weight values to be set for particles, such that the total sum of weight values to be set for particles predicted to be included in a local region approaches an estimated quantity of monitoring targets in the corresponding local region.

For particles expressing a state of one monitoring target, weight values are set so as to amount to one in total. For particles expressing a state of a monitoring target, at least locations and velocities for the monitoring target are set. Based on the locations and the velocities set for the particles, the prediction unit predicts a future location of the monitoring target.

The movement state estimation device may include a quantity output unit (e.g., the number-of-persons output unit 19) outputting a quantity of monitoring targets depending on weights set for particles.

Concretely, the quantity output unit may output a quantity of monitoring targets that have crossed over a predetermined location, based on weights of particles that have crossed over this location.

The movement state estimation device may include a flow calculation unit (e.g., the flow calculation unit 13) calculating an optical flow of target images. The update unit may perform update so as to increase weight values of particles whose movement is close to the optical flow. According to such a configuration, it becomes possible to estimate a movement state, placing importance on particles whose movement is close to movement estimated from images.

The movement state estimation device may include a staying information calculation unit (e.g., the staying information calculation unit 16) extracting a region determined as a staying object from target images. The prediction unit may predict future behavior states of monitoring targets, and as the particles whose behavior states have been predicted to be a stationary state are closer to a region determined as a staying object, the update unit may update weight values of these particles so as to more increase. According to such a configuration, states of monitoring targets that are not moving can be determined appropriately.

The movement state estimation device may include a monitoring target detection unit detecting a monitoring target from a target image (concretely, an individual detection region set, as an area where a monitoring target can be individually detected, in the target image). For the area from which the monitoring target detection means has detected a monitoring target, the update unit may update weight values set for particles predicted to be included in each local region thereof, by a method other than a method using an estimated quantity of monitoring targets in each local region. Examples of such a method include a method in which a general PHD particle filter updates weight values.

In this manner, the movement state estimation method according to the present invention is combined with a method actually detecting a monitoring target so that accuracy in estimating a movement state of monitoring targets can be improved.

In the above, the present invention is described by citing as a typical example the above-described example embodiment. However, the present invention is not limited to the above-described example embodiment. In other words, various configurations that can be understood by those skilled in the art can be adopted in the present invention within the scope of the present invention.

This patent application claims priority based on Japanese Patent Application No. 2015-004963 filed on Jan. 14, 2015, entire disclosure of which is incorporated herein.

INDUSTRIAL APPLICABILITY

The present invention is applicable to a movement state estimation device estimating a quantity of moving objects. For example, the present invention is applicable to a device estimating a flow of objects such as persons or vehicles, or the number of objects crossing over a specific spot, from a video taken with a camera in a monitoring system or the like using a fixed camera or the like.

REFERENCE SIGNS LIST

11 Image input unit
12 Number-of-persons estimation unit
13 Flow calculation unit
14 State storage device
15 State prediction unit
16 Staying information calculation unit
17 Individual person detection unit
18 State update unit
19 Number-of-persons output unit
20 Target image
21, 41a to 41c, 42a to 42c, 43 Local region
50a to 50f, 51a to 51f Particle

The invention claimed is:
1. A device comprising:
at least one memory storing instructions; and
at least one processor configured to execute the instructions to perform:
  obtaining image frames of people, the image frames comprising a first image frame of an area and a second image frame of the area;
  determining, by machine learning, a number of the people in a first region of the first image frame and a number of the people in a second region of the second image frame; and estimating a direction in which at least some of the people are flowing based on the number of the people in the first region of the first image frame and the number of the people in the second region of the second image frame,
wherein the first region represents a first local region of the area,
wherein the second region represents a second local region of the area, and
wherein the first local region and the second local region are isolated from each other such that:
the first local region and the second local region neither overlap nor contact each other,
the first local region does not surround the second local region, and
the second local region does not surround the first local region,
wherein of local regions of the area, the local regions comprising at least the first local region and the second local region, none of the local regions overlaps any other of the local regions, none of all local regions contacts any other of the local regions, none of the local regions surrounds any other of the local regions, and
wherein the local regions of the area comprise all local regions of the area.

2. The device according to claim 1, wherein the at least one processor further executes the instructions to perform:
estimating the direction of flow based on a movement of the people in the plurality of regions.

3. The device according to claim 2,
wherein the movement of the people is based on a motion vector of pixels among a plurality of images including the image.

4. The device according to claim 1,
wherein using the machine learning to estimate the number of the people comprises using a classifier which is trained based on crowd patches, and
wherein the crowd-patches are local images including a crowd state of an overlap of the people.

5. The device according to claim 1, wherein the first region indicates a location which is different from a location being indicated by the second region.

6. The device according to claim 1,
wherein, of the area, there are spaces between each of the local regions, and
wherein at least one of the spaces is greater in size than a total size of any of the local regions.

7. The device according to claim 1
wherein said all local regions of the area are each disjointed from each other.

8. A method comprising:
obtaining image frames of people, the image frames comprising a first image frame of an area and a second image frame of the area;
determining, by machine learning, a number of the people in a first region of the first image frame and a number of the people in a second region of the second image frame; and
estimating a direction in which at least some of the people are flowing based on the number of the people in the first region of the first image frame and the number of the people in the second region of the second image frame,
wherein the first region represents a first local region of the area,
wherein the second region represents a second local region of the area, and
wherein the first local region and the second local region are isolated from each other such that:
the first local region and the second local region neither overlap nor contact each other,
the first local region does not surround the second local region, and
the second local region does not surround the first local region,
wherein of local regions of the area, the local regions comprising at least the first local region and the second local region, none of the local regions overlaps any other of the local regions, none of all local regions contacts any other of the local regions, none of the local regions surrounds any other of the local regions, and
wherein the local regions of the area comprise all local regions of the area.

9. The method according to claim 8, wherein the method further comprises
estimating the direction of flow based on a movement of the people in the plurality of regions.

10. The method according to claim 9,
wherein the movement of the people is based on a motion vector of pixels among a plurality of images including the image.

11. The method according to claim 8,
wherein using the machine learning to estimate the number of the people comprises using a classifier which is trained based on crowd patches, and
wherein the crowd-patches are local images including a crowd state of an overlap of the people.

12. The method according to claim 8, wherein the first region indicates a location which is different from a location being indicated by the second region.

13. A non-transitory computer-readable storage medium storing a program causing a computer to perform processing of:
obtaining image frames of people, the image frames comprising a first image frame of an area and a second image frame of the area;
determining, by machine learning, a number of the people in a first region of the first image frame and a number of the people in a second region of the second image frame; and
estimating a direction in which at least some of the people are flowing based on the number of the people in the first region of the first image frame and the number of the people in the second region of the second image frame,
wherein the first region represents a first local region of the area,
wherein the second region represents a second local region of the area, and
wherein the first local region and the second local region are isolated from each other such that:
the first local region and the second local region neither overlap nor contact each other,
the first local region does not surround the second local region, and
the second local region does not surround the first local region,
wherein of local regions of the area, the local regions comprising at least the first local region and the second local region, none of the local regions overlaps any other of the local regions, none of all local regions contacts any other of the local regions, none of the local regions surrounds any other of the local regions, and wherein the local regions of the area comprise all local regions of the area.

14. The non-transitory computer-readable storage medium according to claim 13, wherein to the program further causes a computer to perform processing of:
   estimating the direction of flow based on a movement of the people in the plurality of regions.

15. The non-transitory computer-readable storage medium according to claim 14,
   wherein the movement of the people is based on a motion vector of pixels among a plurality of images including the image.

16. The non-transitory computer-readable storage medium according to claim 13,
   wherein using the machine learning to estimate the number of the people comprises using a classifier which is trained based on crowd patches, and
   wherein the crowd-patches are local images including a crowd state of an overlap of the people.

17. The non-transitory computer-readable storage medium according to claim 13,
   wherein the first region indicates a location which is different from a location being indicated by the second region.

* * * * *